United States Patent [19]  [11] 4,129,610
Kobayashi et al.  [45] Dec. 12, 1978

[54] WATER-SOLUBLE COATING COMPOSITION FOR SHIP BOTTOMS

[75] Inventors: Kengo Kobayashi; Masayuki Mogami; Shigeyoshi Tanaka, all of Hitachi; Manabu Nakao; Sadao Tamura, both of Hiroshima, all of Japan

[73] Assignees: Hitachi Chemical Co., Ltd.; Chugoku Marine Paints, Ltd.

[21] Appl. No.: 735,031

[22] Filed: Oct. 22, 1976

[30] Foreign Application Priority Data

Oct. 23, 1975 [JP] Japan .................. 50-128029

[51] Int. Cl.$^2$ .................. C08L 63/02; C08L 63/10
[52] U.S. Cl. .................. 260/837 R; 260/18 FP; 260/19 EP; 260/29.3; 260/29.6 NR; 260/42.22; 260/836; 428/461; 428/500; 428/523
[58] Field of Search ............ 260/837 R, 836, 29.6 NR

[56] References Cited

U.S. PATENT DOCUMENTS

| | | | |
|---|---|---|---|
| 2,940,950 | 6/1960 | Gusman | 260/837 X |
| 3,222,418 | 12/1965 | Murdock | 260/837 X |
| 3,466,266 | 9/1969 | Nagata et al. | 260/837 X |
| 3,509,086 | 4/1970 | Rohrbacher | 260/837 X |
| 3,943,187 | 3/1976 | Wu | 260/837 |

*Primary Examiner*—Howard E. Schain
*Attorney, Agent, or Firm*—Craig and Antonelli

[57] ABSTRACT

A water-soluble coating composition for ship bottom comprising (A) 70 – 95 parts by weight of a vinyl copolymer of
  (a) 5 – 40% by weight of monoethylenic unsaturated monomer having at least one basic nitrogen atom,
  (b) 5 – 40% by weight of monoethylenic unsaturated monomer having at least one amide group, and
  (c) at least one monoethylenic unsaturated monomer copolymerizable with the said components (a) and (b), a total of the components (a), (b) and (c) being 100% by weight, and (B) 30 – 5 parts by weight of a water-soluble epoxy compound, shows excellent effect on controlling release rate of the toxic material from the primer coating layer and on inhibiting adhesion of marine organisms to ship bottoms, when applied to the primer coating layer of ship bottoms.

12 Claims, No Drawings

WATER-SOLUBLE COATING COMPOSITION FOR SHIP BOTTOMS

This invention relates to a water-soluble coating composition for ship bottoms.

Heretofore, as ship bottom paints, there have been used antifouling paints containing fats and oils, chlorinated rubbers, vinyl resins, or the like together with such a toxic material as copper oxide, an organic tin compound, or the like in order to inhibit adhesion and growth of marine vegetable and animal organisms such as barnacles, oysters, serpulae, and the like, said toxic material being released and spread continuously from the coating into water. After the release of the toxic material, there are produced cavities in or roughness on the surface of the antifouling coating. With an increase of degree of surface roughness, there appear unfavorable influences such as an increase of abrasion resistance between the hull and water, loss in speed of a ship, an increase of consuming amount of fuel, and the like.

As a controlling method of release rate of the toxic material, it has been proposed to coat the antifouling coating, i.e. the primer coating layer, with a hydrophilic crosslinking polymer prepared by mixing a hydrophilic polymer of, for example, β-hydroxyethyl methacrylate, ethylene glycol monomethacrylate, or the like with 0.1-2.5% by weight of diester monomer such as ethylene glycol dimethacrylate, propylene glycol diacrylate, or the like as a crosslinking agent and using benzoyl peroxide, cobalt naphthenate or the like as a catalyst. But said method is only effective when an antifouling paint containing a toxic material having a great release rate is used as the primer coating layer. If an antifouling paint containing a toxic material having a low release rate is used as the primer coating layer, the release of the toxic material becomes too little according to said method, which results in a remarkable decrease in antifouling effect. Therefore it is a defect of said method that said method is only applicable to the limited toxic materials.

It is an object of this invention to solve the above-mentioned problem and to provide a coating composition for ship bottoms containing a water-soluble curing type polymer without using an organic solvent. By applying said coating composition on the primer coating layer having a toxic material, it is possible not only to control the release rate of the toxic material but also to avert increase of degree of surface roughness caused by the release of the toxic material.

The present invention provides a water-soluble coating composition for ship bottoms comprising (A) 70 to 95 parts by weight of a vinyl copolymer of
 (a) 5 to 40% by weight of monoethylenic unsaturated monomer having at least one basic nitrogen atom,
 (b) 5 to 40% by weight of monoethylenic unsaturated monomer having at least one amide group, and
 (c) at least one monoethylenic unsaturated monomer copolymerizable with the said components (a) and (b), a total of the components (a), (b) and (c) being 100% by weight, and (B) 30 to 5 parts by weight of a water-soluble epoxy compound.

The component (a) in the vinyl copolymer (A), i.e. a monoethylenic unsaturated monomer having at least one basic nitrogen atom, is a component which pertains to the crosslinking reaction with the component (B), i.e. a water-soluble epoxy compound. It is used in the proportion of 5 to 40% by weight, preferably 10 to 20% by weight. If the proportion is below 5% by weight, the crosslinking reaction cannot be attained sufficiently and the release rate of the toxic material from the primer coating layer becomes too great. If the proportion is above 40% by weight, pot life of the coating composition of the present invention becomes unfavorably too short.

The component (b), i.e. a monoethylenic unsaturated monomer having at least one amide group, is a component which gives hydrophilic property to the cured coating and is used in the proportion of 5 to 40% by weight, preferably 10 to 30% by weight in the component (A). If the proportion is below 5% by weight, hydrophilic property of the cured coating is insufficient and the release of the toxic material from the primer coating layer is difficult. If the proportion is above 40% by weight, the release rate of the toxic material becomes unfavorably too great.

The component (c), i.e. at least one monoethylenic unsaturated monomer copolymerizable with the components (a) and (b), is used in the rest of the proportions of the components (a) and (b) so that a total of the components (a), (b) and (c) becomes 100% by weight. As the component (c), there may be used monoethylenic unsaturated monomers having hydroxyl groups or carboxyl groups, esters of said monomers, and other vinyl compounds. Among them, monoethylenic unsaturated monomers having hydroxyl groups are preferable and may be used in the proportion of 35 to 100% by weight based on the weight of the component (c).

The vinyl copolymer of the component (A) can be prepared by a conventional process, e.g. using such a reaction medium as water and/or isopropyl alcohol, such a molecular weight modifier as mercaptosuccinic acid, t-dodecyl mercaptan, or carbon tetrachloride, and such a catalyst as sodium metabisulfite, potassium persulfate, a peroxide, e.g. benzoyl peroxide, or an azo compound, e.g. $\alpha,\alpha'$-azobisisobutyronitrile, and reacting the components (a), (b) and (c) at a temperature of from 50° to 100° C. for 2 to 10 hours with heating. After the reaction, the reaction mixture is diluted with water to have a suitable amount of the solid.

The component (A) and the component (B) are used in the range of the weight ratio of (A)/(B) = 70/30–95/5. If the weight ratio is larger than 95/5, the crosslinking reaction cannot be attained sufficiently and the release of the toxic material from the primer coating layer becomes too fast, while if the weight ratio is smaller than 70/30, pot life of the coating composition becomes too short.

Examples of the component (a) are aminoalkyl esters, alkylaminoalkyl esters and dialkylaminoalkyl esters of acrylic acid such as dimethylaminoethyl acrylate, dimethylaminopropyl acrylate, dimethylaminobutyl acrylate, diethylaminoethyl acrylate, diethylaminobutyl acrylate, diethylaminopropyl acrylate, dipropylaminoethyl acrylate, dipropylaminopropyl acrylate, dipropylaminobutyl acrylate, dibutylaminoethyl acrylate, dibutylaminopropyl acrylate, dibutylaminobutyl acrylate, methylaminoethyl acrylate, methylaminopropyl acrylate, methylaminobutyl acrylate, ethylaminoethyl acrylate, ethylaminopropyl acrylate, ethylaminobutyl acrylate, propylaminoethyl acrylate, propylaminopropyl acrylate, propylaminobutyl acrylate, isopropylaminoethyl acrylate, isopropylaminopropyl acrylate, isopropylaminobutyl acrylate, butylaminoethyl acrylate, butylaminopropyl acrylate, butylaminobutyl acrylate, isobutylaminoethyl acrylate, isobutylaminopropyl acrylate, isobutylaminobutyl acrylate, and the like, and the same alkylaminoalkyl esters, aminoalkyl esters and dialkylaminoalkyl esters of methacrylic acid as mentioned above, and the like.

Examples of the component (b) are acrylamide and its derivatives, e.g. N-alkylacrylamide such as N-propylacrylamide, N-isopropylacrylamide, N-butylacrylamide, N-methylacrylamide; diacetoneacrylamide; N-hydroxyalkylacrylamide such as N-2-hydroxyethylacrylamide, and the like; methacrylamide and its derivatives e.g. N-alkylmethacrylamide such as N-propylmethacrylamide, N-isopropylmethacrylamide, N-butylmethacrylamide, N-methylmethacrylamide; N-hydroxyalkylmethacrylamide such as N-2-hydroxyethylmethacrylamide, and the like.

Examples of the component (c) are hydroxyalkyl esters of acrylic acid such as 2-hydroxyethyl acrylate, diethylene glycol monoacrylate, 2-hydroxypropyl acrylate, $\beta$-hydroxypropyl acrylate, dipropylene glycol monoacrylate; the same hydroxyalkyl esters of methacrylic acid as mentioned above; acrylic acid, methacrylic acid, itaconic acid; alkyl or alkoxyalkyl esters of acrylic acid such as methyl acrylate, ethyl acrylate, propyl acrylate, butyl acrylate, isobutyl acrylate, tert-butyl acrylate, amyl acrylate, hexyl acrylate, cyclohexyl acrylate, octyl acrylate, 2-ethylhexyl acrylate, lauryl acrylate, stearyl acrylate, methoxyethyl acrylate, ethoxyethyl acrylate; the same alkyl or alkoxyalkyl esters of methacrylic acid as mentioned above; aromatic vinyl compounds such as styrene, methylstyrene, vinyltoluene, $\alpha$-methylstyrene; vinyl chloride, vinyl acetate, acrylonitrile, methacrylonitrile, and the like.

Commercially available examples of the component (A) are Hitaloid-TS-3C (trade name, manufactured by Hitachi Chemical Co., Ltd.), and the like.

As the water-soluble epoxy compounds of the component (B), there are water-soluble epoxy resins prepared by the reaction of an epihalohydrin such as epichlorohydrin with an aliphatic polyvalent alcohol such as ethylene glycol, propylene glycol, diethylene glycol, glycerin, or the like. Commercially available examples of the component (B) are Epikote 812 (trade name, manufactured by Shell Chemical Co.), Eporite 40E, 200E, 400E (trade name, manufactured by Kyoeisha Yushi Co.) and the like.

The coating composition of the present invention may include additives such as pigments, e.g. titanium white, chrome yellow, and the like, fillers, e.g. calcium sulfate, calcium carbonate, talc, and the like.

The coating composition of the present invention is used for coating the primer coating layer. As the primer coating layer, there are generally used fats and oils, chlorinated rubbers, vinyl resins, and the like containing a toxic material such as organic tin compounds, e.g. triphenyltin hydroxide, triphenyltin acetate, triphenyltin chloride, and the like, copper oxide, and the like. The release of the toxic material from the primer coating layer can be controlled by coating the primer coating layer with the coating composition of the present invention. For example, by lowering the degree of crosslinking of the coating composition of the present invention, it is possible to increase hydrophilic property of the cured coating and to make great the release rate of the toxic material from the primer coating layer. On the other hand, by increasing the degree of crosslinking of the coating composition of the present invention, it is possible to decrease hydrophilic property of the cured coating and to make low the release rate of the toxic material from the primer coating layer. This control can also be attained by changing the amount of the component (b) to be used. Further, if the primer coating layer is used alone, degree of surface roughness increases due to the release of the toxic material. On the contrary, according to the present invention, since the primer coating layer is coated with the coating composition, it is possible to avert the increase of degree of surface roughness.

The present invention is illustrated by way of the following Examples, in which all the parts and percents are by weight.

EXAMPLE 1

In a flask equipped with a stirrer, a thermometer, a reflux condenser, a dropping funnel and a gas introducing pipe, 40 parts of water, 20 parts of isopropyl alcohol and 1 part of sodium metabisulfite were placed and the contents were heated at 80° C. Then a mixture of 20 parts of dimethylaminoethyl methacrylate as the component (a), 35 parts of acrylamide as the component (b) and 20 parts of $\beta$-hydroxyethyl methacrylate and 15 parts of methyl acrylate as the component (c) was dropped in 2 hours. At the same time, 10 parts of water dissolving 2 parts of ammonium persulfate was dropped in 2 hours. Then the reaction was carried out at 80° C. for 4 hours. After the reaction, the reaction mixture was cooled and the solid content was adjusted to 40% with water. Viscosity of the resulting reaction product solution was U–V by a Gardner mobilometer.

90 Parts of the resulting reaction product solution was mixed with 10 parts of Epikote 812 (trade name, Shell Chemical Co.) and the primer containing a toxic material was coated with the resulting mixture. This coating showed excellent result in inhibiting adhesion of barnacles, oysters, serpulae, and the like as shown in Table 1.

EXAMPLE 2

Using the same apparatus as used in Example 1, 30 parts of water and 30 parts of isopropyl alcohol were heated at 60° C. Then 25 parts of diethylaminoethyl methacrylate as the component (a), 20 parts of methacrylamide as the component (b) and 30 parts of $\beta$-hydroxypropyl methacrylate and 25 parts of butyl acrylate as the component (c), and 2 parts of $\alpha,\alpha'$-azobisisobutyronitrile as a catalyst were dropped uniformly in 6 hours. Then the reaction was carried out at 80° C. for 4 hours. After the reaction, the reaction mixture was cooled and the solid content was adjusted to 50% with water. Viscosity of the resulting reaction product solution was Y–Z by a Gardner mobilometer.

100 Parts of the resulting reaction product solution was mixed with 10 parts of Epikote 812 (trade name, Shell Chemical Co.) and the primer containing a toxic material was coated with the resulting mixture. This coating was immersed in sea water and showed excellent antifouling effect.

EXAMPLE 3

Using the same apparatus as used in Example 1, 50 parts of water, 10 parts of isopropyl alcohol and 2 parts of sodium metabisulfite were heated at 70° C. Then a mixture of 30 parts of dimethylaminoethyl methacrylate, as the component (a), 15 parts of acrylamide as the component (b) and 20 parts of β-hydroxyethyl acrylate, 20 parts of ethyl acrylate and 15 parts of methyl methacrylate as the component (c) was dropped uniformly in 5 hours. At the same time, 10 parts of water dissolving 2 parts of potassium persulfate was dropped uniformly in 5 hours. Then the reaction was carried out at 70° C. for 4 hours. After the reaction, the reaction mixture was cooled and the solid content was adjusted to 40% with water. Viscosity of the resulting reaction product solution was S–T by a Gardner mobilometer.

80 Parts of the resulting reaction product solution was mixed with 20 parts of Epikote 812 (trade name) and the primer containing a toxic material was coated with the resulting mixture. This coating inhibited adhesion of barnacles, oysters, serpulae, and the like, when immersed in sea water.

Various test results were obtained by using the coating compositions prepared by Examples 1–3 and known paints (Comparative Examples) and listed in Table 1.

of individual test specimens were determined based on the torque value of 100 of the test specimen of Experiment No. 4.

(2) Surface state and adhesion of marine organisms (a) Preparation of test specimens Test specimens were prepared in the same manner as mentioned above item (1) (a) but using sandblasted copper plates of 300 mm × 100 mm × 3 mm in place of the aluminum plates.

(b) Test method

Test specimens had been immersed in Nagasaki Bay, Japan, for the period of about 10 months from October 7, 1974 to July 31, 1975. Cavity was observed by a microscope of 50 magnifications. Evenness was examined with the touch and evaluated with the marks, ○, Δ, and X, in this order from the best to the worst. Adhesion of marine vegetable and animal organisms was Table 1

| Experiment No. | 1 | 2 | 3 | 4 | 5 | 6 |
|---|---|---|---|---|---|---|
| Primer | Vinyl anti-corrosive and anti-fouling paints | Vinyl anti-corrosive and anti-fouling paints | Vinyl anti-corrosive and anti-fouling paints | Vinyl anti-corrosive and anti-fouling paints | Vinyl anti-corrosive and anti-fouling paints | Oleoresinous anti-corrosive and anti-fouling paints |
| Finish cost | Paint of Example 1 | Paint of Example 2 | Paint of Example 3 | — | Hydrophilic crosslinking polymer | — |
| Abrasion resistance in water | 80–85 | 80–85 | 80–85 | 100 | 90–95 | 95 |
| Surface state — Cavity | None | None | None | Many | A few | Many |
| Surface state — Evenness | ○ | ○ | ○ | X | Δ~○ | X |
| Adhesion of marine organisms | None | None | None | A few | A few | Slight |
| Note | Example | Example | Example | Comparative Example | Comparative Example | Comparative Example |

Test methods (1) Abrasion resistance in water (a) Preparation of test specimens In the case of Experiments Nos. 1–5, an aluminum circular plate of 20 cm diameter and 3 mm thick was coated with a wash primer for light metals, Evabond (trade name, manufactured by Chugoku Marine Paints, Ltd.), 8μ in thickness, followed by coating with vinyl anti-corrosive paint each 20μ in thickness four times and by coating with vinyl antifouling paint each 45μ in thickness two times. After that, in the case of Experiments Nos. 1–3, each coating composition prepared in Examples 1–3 was used to recoat the resulting surface 5μ in thickness and dried for 3 days. In the case of Experiment No. 4, no finish coat was used. In the case of Experiment No. 5, 2-hydroxyethyl methacrylate containing 2% of ethylene glycol dimethacrylate as a crosslinking agent and cobalt naphthenate and t-butyl peroctoate as catalyst was used to recoat the resulting surface 5μ in thickness and to be cured. In the case of Experiment No. 6, said aluminum plate was coated with a wash primer for light metals, Evabond (trade name), 8μ in thickness, followed by coating with oleoresinous anti-corrosive paint each 40μ in thickness three times and by coating with oleoresinous antifouling paint each 45μ in thickness two times.

(b) Test method

Torque value of each coated aluminum plate was measured by using an apparatus for measuring decreasing rate of abrasion resistance in water. Torque values observed with the naked eye.

As is clear from the results in Table 1, when the coating compositions of the present invention were used as finish coats, the abrasion resistance in water is very low and lower than the case of using a known hydrophilic polymer as finish coat, and excellent surface state can be maintained after a long period of the immersion in sea water without adhesion of marine organisms.

On the other hand, hydrophilic property of the coating compositions of the present invention can be adjusted by degree of crosslinking as shown in Table 2.

Table 2

| Experiment No. | 7 | 8 | 9 |
|---|---|---|---|
| Coating composition (parts) — Water-soluble acrylic resin* | 8 | 8 | 8 |
| Coating composition (parts) — Epikote 812 | 0.5 | 1 | 2 |
| Coating composition (parts) — Water | 36 | 36 | 36 |
| Coating composition (parts) — Isopropanol | 36 | 36 | 36 |
| Water absorption (%) | 150 | 117 | 95 |
| Note | Example | Example | Example |

*Hitaloid-TS-3C (trade name, manufactured by Hitachi Chemical Co., Ltd.) was used.

Test method

The coating compositions of Experiments Nos. 7–9 were placed on watch glasses and let stand for 7 days at ordinary temperature to be cured. Then the watch glasses were put in a desiccator to obtain constant weight. After constant weight was obtained, the watch glasses were weighed. The watch glasses were immersed in distilled water for 10 hours and weighed to measure increase of the weight. Water absorption was calculated by using the following formula:

$$\text{Water absorption} = \frac{\text{(Weight after immersion)} - \text{(Weight before immersion)}}{\text{(Weight before immersion)}} \times 100(\%)$$

As is clear from Table 2, it is possible to control water absorption of the cured coating by adjusting the degree of crosslinking.

EXAMPLE 4

An iron plate of 100 mm × 100 mm × 1 mm was coated with Evabond (trade name, manufactured by Chugoku Marine Paints, Ltd.) 8μ in thickness, followed by coating with chlorinated rubber anti-corrosive paint each 40μ in thickness three times and by coating with chlorinated rubber antifouling paint each 45μ in thickness two times. The iron plate was recoated with the coating composition of the present invention as listed in Table 3, 5μ in thickness. The resulting test specimen was immersed in sea water and release rate of copper was measured at prescribed period as shown in Table 3. The results are as shown in Table 3. Generally speaking, the release rate of copper into sea water of 10 μg/cm$^2$/day or more shows good antifouling effect.

Table 3

| Coating composition (parts) | Component A[*1] | 95 | 90 | 80 | 70 |
|---|---|---|---|---|---|
| | Component B[*2] | 5 | 10 | 20 | 30 |

| | | Release rate of copper (μg/cm$^2$/day) | | | |
|---|---|---|---|---|---|
| Immersion period | 7 days | 35 | 26 | 22 | 20 |
| | 1 month | 30 | 24 | 20 | 18 |
| | 3 months | 24 | 19 | 17 | 15 |
| | 6 months | 21 | 18 | 16 | 14 |
| | 9 months | 17 | 16 | 16 | 16 |
| | 12 months | 14 | 14 | 16 | 13 |
| | 18 months | 12 | 14 | 16 | 13 |

[*1] Hitaloid-TS-3C (trade name, Hitachi Chemical Co., Ltd.)
[*2] Epikote 812 (trade name, Shell Chemical Co.)

EXAMPLE 5

An iron plate of 100 mm × 100 mm × 1 mm was coated with Evabond (trade name, Chugoku Marine Paints, Ltd.) 8μ in thickness, followed by coating with vinyl anti-corrosive paints each 20μ in thickness four times, and by coating with vinyl antifouling paint each 45μ in thickness two times. The iron plate was recoated with the coating composition of the present invention as listed in Table 4, 5μ in thickness. Release rate of copper was measured as described in Example 4. The results are as shown in Table 4.

Table 4

| Coating composition (parts) | Component A[*1] | 95 | 90 | 80 | 70 |
|---|---|---|---|---|---|
| | Component B[*2] | 5 | 10 | 20 | 30 |

| | | Release rate of copper (μg/cm$^2$/day) | | | |
|---|---|---|---|---|---|
| Immersion period | 7 days | 45 | 35 | 30 | 28 |
| | 1 month | 38 | 30 | 25 | 23 |
| | 3 months | 32 | 27 | 22 | 20 |
| | 6 months | 26 | 26 | 21 | 19 |
| | 9 months | 20 | 24 | 20 | 18 |
| | 12 months | 18 | 19 | 19 | 19 |
| | 18 months | 14 | 15 | 17 | 14 |

[*1] Hitaloid-TS-3C (trade name, Hitachi Chemical Co., Ltd.)
[*2] Epikote 812 (trade name, Shell Chemical Co.)

As is clear from the results in Tables 3 and 4, it is possible to control the release rate of the toxic material from the primer coating layer by adjusting the degree of crosslinking of the coating composition of the present invention.

As is clear from the above results, according to the present invention, it is possible to control the release rate of the toxic material from the primer coating layer and to effectively prevent ship bottoms from adhesion of marine organisms by adjusting the degree of crosslinking of the coating composition. Further, since it is possible to maintain degree of roughness of the coated surface at low level, it is possible to avert loss in speed of the ship and an increase of consuming amount of fuel.

Compositions of the anti-corrosive paints and antifouling paints used in the Examples, which are manufactured by Chugoku Marine Paints, Ltd., are as follows:

| Oleoresinous anti-corrosive paint | |
|---|---|
| Phenolic resin | 22.0% |
| Linseed boiled oil | 4.0 |
| Tung boiled oil | 2.0 |
| Aluminum powder | 12.0 |
| Red iron oxide | 5.0 |
| Talc | 7.0 |
| Gypsum | 7.0 |
| Aluminum stearate | 1.0 |
| Dryer | 2.0 |
| Solvent naphtha | 23.0 |
| Mineral spirit | 15.0 |
| Total | 100.0 |

| Oleoresinous antifouling paint | |
|---|---|
| Linseed boiled oil | 14.0% |
| Rosin | 15.0 |
| Cuprous oxide | 40.0 |
| Red iron oxide | 6.0 |
| Talc | 3.0 |
| Aluminum stearate | 1.0 |
| Solvent naphtha | 12.0 |
| Mineral spirit | 9.0 |
| Total | 100.0 |

| Vinyl anti-corrosive paint | |
|---|---|
| VAGH | 15.0% |
| Aluminum powder | 12.0 |
| Tricresyl phosphate | 1.0 |
| Pb stabilizer | 1.0 |
| Methyl isobutyl ketone | 36.0 |
| Toluene | 35.0 |
| Total | 100.0 |

VAGH: Polyvinyl chloride (Union Carbide Corp., U.S.A.)

| Vinyl antifouling paint | |
|---|---|
| VYHH | 5.5% |
| Rosin | 5.5 |
| Tricresyl phosphate | 4.0 |
| Cuprous oxide | 55.0 |
| Pb stabilizer | 0.3 |
| Thixatrol ST | 0.7 |
| Methyl isobutyl ketone | 14.0 |
| Solvent naphtha | 15.0 |
| Total | 100.0 |

VYHH: Polyvinyl chloride (Union Carbide Corp., U.S.A.)
Thixatrol ST: Thixotropic agent (National Lead Co., U.S.A.)

| Chlorinated rubber anti-corrosive paint | |
|---|---|
| CR-20 | 15.0% |
| Chlorinated paraffin | 8.0 |
| Aluminum powder | 12.0 |
| Red iron oxide | 8.0 |
| Talc | 10.0 |
| Zinc oxide | 3.0 |
| Thixatrol ST | 1.0 |

-continued

Chlorinated rubber anti-corrosive paint

| Epikote 828 | 1.0 |
|---|---|
| Xylene | 42.0 |
| Total | 100.0 |

CR-20: Chlorinated rubber (Imperial Chemical Industries, Ltd.)
Epikote 828: Epoxy resin (Shell Chemical Co.)

Chlorinated rubber antifouling paint

| CR-20 | 8.5% |
|---|---|
| Rosin | 8.5 |
| Chlorinated paraffin | 4.0 |
| Cuprous oxide | 40.0 |
| Red iron oxide | 6.0 |
| Zinc oxide | 3.0 |
| Epikote 828 | 0.5 |
| Thixatrol ST | 0.5 |
| Xylene | 29.0 |
| Total | 100.0 |

What is claimed is:

1. A water-soluble coating composition for coating ship bottoms comprising
   (A) 70–95 parts by weight of a vinyl copolymer of
      (a) 5–40% by weight of one monoethylenic unsaturated monomer having at least one basic nitrogen atom, selected from the group consisting of aminoalkyl ester, alkylaminoalkyl ester, or dialkylaminoalkyl ester of acrylic acid or methacrylic acid,
      (b) 5–40% by weight of another monoethylenic unsaturated monomer having at least one amide group, and
      (c) at least one monoethylenic unsaturated monomer copolymerizable with the components (a) and (b), a total of the components (a), (b), and (c) being 100% by weight, and
   (B) 30–5 parts by weight of a water-soluble epoxy resin compound.

2. A water-soluble coating composition according to claim 1, wherein the component (a) in the component (A) is 10–20% by weight.

3. A water-soluble coating composition according to claim 1, wherein the component (b) is acrylamide, methacrylamide, an N-alkylacrylamide, an N-alkylmethacrylamide, an N-hydroxyalkylacrylamide, an N-hydroxyalkylmethacrylamide or diacetoneacrylamide.

4. A water-soluble coating composition according to claim 1, wherein the component (b) in the component (A) is 10–30% by weight.

5. A water-soluble coating composition according to claim 1, wherein the component (c) includes 35–100% by weight of monoethylenic unsaturated monomer having at least one hydroxyl group.

6. A water-soluble coating composition according to claim 1, wherein the component (B) is a water-soluble epoxy resin prepared from an aliphatic polyvalent alcohol and an epihalohydrin.

7. A water-soluble coating composition according to claim 1, wherein said aminoalkyl ester, alkylaminoalkyl ester or dialkylaminoalkyl ester of acrylic acid or methacrylic acid is selected from the group consisting of dimethylaminoethyl acrylate or methacrylate, dimethylaminopropyl acrylate or methacrylate, dimethylaminobutyl acrylate or methacrylate, diethylaminoethyl acrylate or methacrylate, diethylaminobutyl acrylate or methacrylate, diethylaminopropyl acrylate or methacrylate, dipropylaminoethyl acrylate or methacrylate, dipropylaminopropyl acrylate or methacrylate, dipropylaminobutyl acrylate or methacrylate, dibutylaminoethyl acrylate or methacrylate, dibutylaminopropyl acrylate or methacrylate, dibutylaminobutyl acrylate or methacrylate, methylaminoethyl acrylate or methacrylate, methylaminopropyl acrylate or methacrylate, methylaminobutyl acrylate or methacrylate, ethylaminoethyl acrylate or methacrylate, ethylaminopropyl acrylate or methacrylate, ethylaminobutyl acrylate or methacrylate, propylaminoethyl acrylate or methacrylate, propylaminopropyl acrylate or methacrylate, propylaminobutyl acrylate or methacrylate, isopropylaminoethyl acrylate or methacrylate, isopropylaminopropyl acrylate or methacrylate, isopropylaminobutyl acrylate or methacrylate, butylaminoethyl acrylate or methacrylate, butylaminopropyl acrylate or methacrylate, butylaminobutyl acrylate or methacrylate, isobutylaminoethyl acrylate or methacrylate, isobutylaminopropyl acrylate or methacrylate, and isobutylaminobutyl acrylate or methacrylate.

8. A water-soluble coating composition according to claim 1, wherein the component (b) is selected from the group consisting of N-propylacrylamide, N-isopropylacrylamide, N-butylacrylamide, N-methylacrylamide, diacetoneacrylamide, N-2-hydroxyethylacrylamide, N-propylmethacrylamide, N-isopropylmethacrylamide, N-butylmethacrylamide, N-methylmethacrylamide, and N-2-hydroxyethylmethacrylamide.

9. A water-soluble coating composition according to claim 1, wherein said at least one monoethylenic unsaturated monomer is selected from the group consisting of hydroxyalkyl esters of acrylic acid, hydroxyalkyl esters of methacrylic acid, acrylic acid, methacrylic acid, itaconic acid; alkyl or alkoxyalkyl esters of acrylic acid, alkyl or alkoxyalkyl esters of methacrylic acid, aromatic vinyl compounds, vinyl chloride, vinyl acetate, acrylonitrile and methacrylonitrile.

10. A water-soluble coating composition according to claim 6, wherein said epihalohydrin is epichlorohydrin.

11. A water-soluble coating composition according to claim 10, wherein said aliphatic polyvalent alcohol is selected from the group consisting of ethylene glycol, propylene glycol, diethylene glycol, and glycerin.

12. A water-soluble coating composition according to claim 1, wherein the composition consists essentially of said vinyl copolymer and said water-soluble resin compound.

* * * * *